Jan. 7, 1930.  J. C. MacLACHLAN  1,742,478
DISTRIBUTING HEAD FOR DRYING APPARATUS
Filed Aug. 6, 1926    2 Sheets-Sheet 1
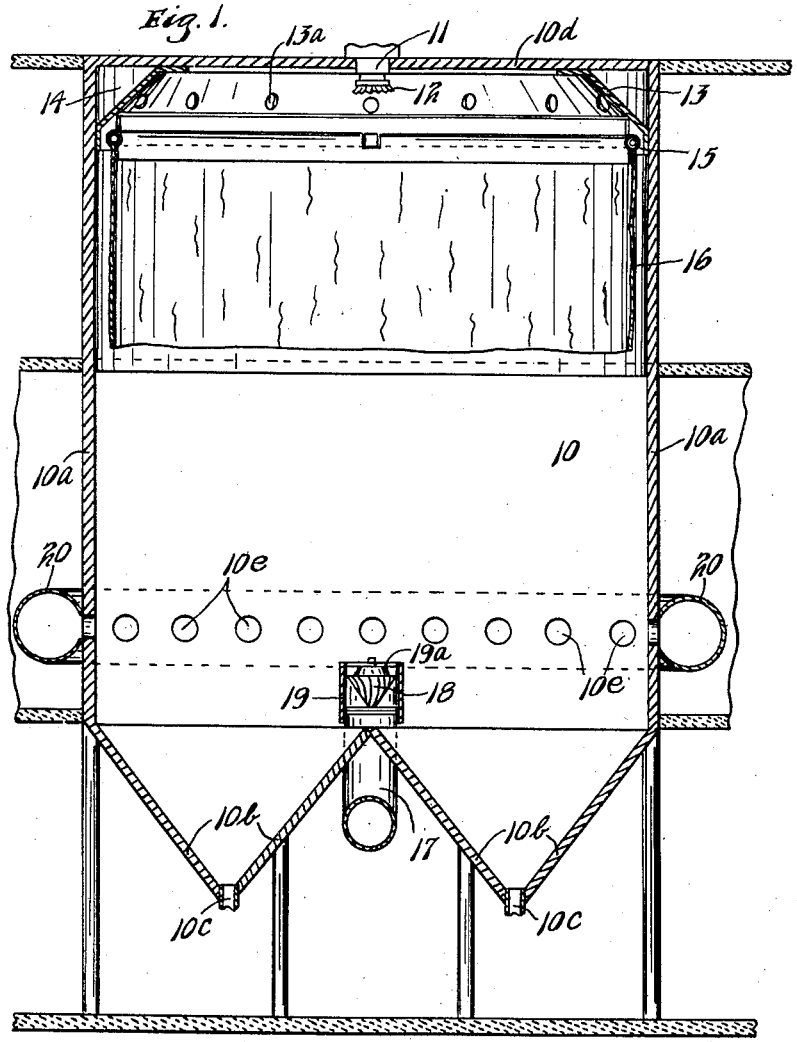
INVENTOR.
JOHN C. MACLACHLAN.
BY HIS ATTORNEYS.

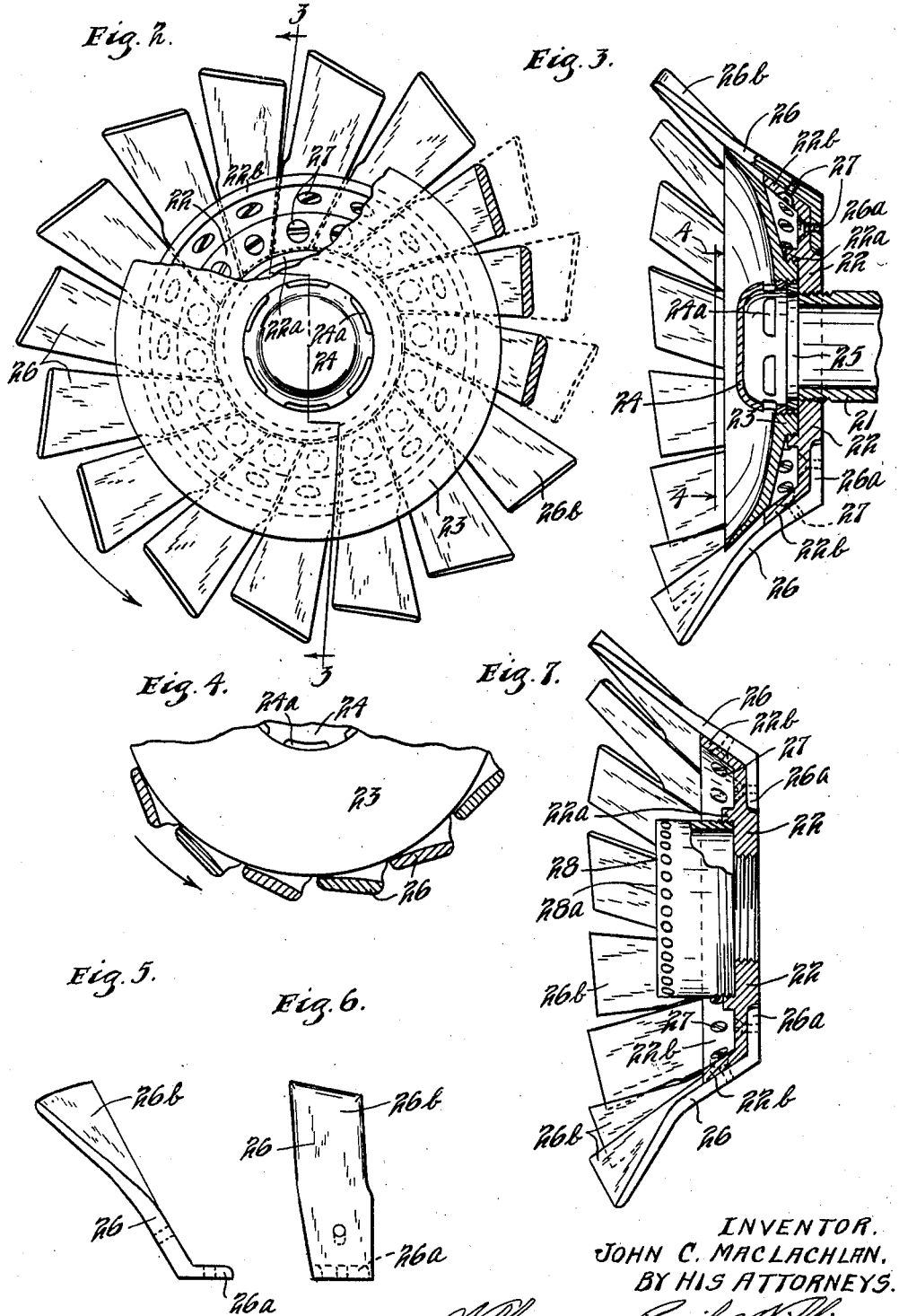

Patented Jan. 7, 1930

1,742,478

UNITED STATES PATENT OFFICE

JOHN C. MacLACHLAN, OF CHICAGO, ILLINOIS

DISTRIBUTING HEAD FOR DRYING APPARATUS

Application filed August 6, 1926. Serial No. 127,561.

This invention relates to a drying apparatus for drying liquids or semi-liquid material, and particularly to a distributing head for such an apparatus. As is well known, such drying apparatus is now used for drying milk, buttermilk, blood, fruit juices and various other liquids. In the present type of apparatus the liquid is dried by being discharged into a drying chamber in a very fine condition and dried by heated air passing through said chamber. In drying whole milk and other liquids, it is desirable that the liquid be divided as finely as possible without impact as the impact tends to break up the fat and other globules in the milk and to prevent the dried product going readily into solution. In the present type of apparatus the milk or other liquid is distributed centrifugally by a discharging head which is driven at very high speed. If a single disk is used, it is necessary to have quite a large diameter to secure the necessary peripheral speed for throwing the material outwardly to divide the same and it is necessary to drive the disk at extremely high speed.

It is an object of this invention, therefore, to provide a distributing head for liquid to be used in a drying apparatus which will not be of excessive diameter and yet one which will effectively distribute liquid and discharge the same in very fine spray.

It is another object of this invention to provide a distributing head for a drying apparatus having a central distributing portion for the liquid and a plurality of members surrounding said portion and receiving liquid therefrom, adapted to throw the liquid outwardly and being circumferentially spaced and so arranged that air passes between the same in the rotation of said head.

It is a further object of the invention to provide a distributing head having a central feeding conduit with lateral discharge openings, a concave disk having its surface receiving and substantially alined with said discharge openings and a plurality of circumferentially spaced blades at the outer edge of said disk and receiving therefrom, said blades diverging outwardly from said disk, being spaced and having their surfaces disposed at an angle to each other.

It is more specifically an object of this invention to provide a head such as set forth in the preceding paragraph, in which said conduit, disk and blades are rigidly connected for simultaneous rotation, said blades having substantially parallel inner and outer surfaces and having straight sides and ends.

It is still another object of the invention to provide a novel method of distributing and finely dividing liquid and drying the same.

These and other objects and advantages of the invention will be fully set forth in the following description made in connection with the accompanying drawings, in which like reference characters refer to similar parts throughout the several views and in which:—

Fig. 1 is a vertical section through the drying cabinet of the drying apparatus;

Fig. 2 is a bottom plan view of the drying head, some parts being broken away and other parts being shown in horizontal section;

Fig. 3 is a substantially vertical section taken on line 3—3 of Fig. 2 as indicated by the arrows;

Fig. 4 is a horizontal section of the head taken substantially at the point indicated by the line 4—4 in Fig. 3;

Fig. 5 is a side view of one of the blades used;

Fig. 6 is a front view of said blade; and

Fig. 7 is a view similar to Fig. 3 showing a modification.

Referring to the drawings, a drying apparatus is shown comprising a cabinet 10 having the walls 10$^a$, which cabinet may be either of angular shape in cross section, or of cylindrical shape. The cabinet is shown as having receiving hoppers or compartments 10$^b$ at its bottom with converging bottoms having discharge outlets 10$^c$. The cabinet 10 has a top 10$^d$ through which projects the distributing apparatus 11 through which the material is fed and which comprises the rotating head 12 at its lower portion. An inclined wall 13 extends about the upper corner of the cabinet forming a chamber 14 through which some of the air passes, said wall having openings 13ª therethrough communicating with chamber 14. A rod 15 is shown extending around the wall 10ª adjacent its upper end from which depends a fabric or flexible curtain 16. The drying air is supplied at the bottom of the cabinet and substantially at the center thereof by a conduit 17 above which is a conical deflector 18 surrounded by a cylinder 19, which cylinder is open at its upper end, but which has a bar 19ª across its top forming one of the bearings for the member 18. The cabinet 10 or the walls 10ª thereof have a plurality of discharge openings 10ᵉ which communicate with a conduit 20 extending about said wall through which air and some of the dried material will be drawn.

The liquid being dried is discharged into the chamber 10 as stated, through the distributor 12 forming a part of the present invention. The distributor 12 is rotated at high speed preferably by a turbine motor and the same comprises a pipe or conduit 21 which extends centrally downward in the member 11 and is secured at its lower end by a threaded connection to a circular plate 22 which may be made of suitable metal such as brass. The plate has an inwardly extending annular flange 22ª which is interiorly threaded and in which is secured the exteriorly threaded hub of the disk member 23 having a concave inner surface. The hub of the disk 23 is also interiorly threaded and a cup or shell 24 is threaded into said hub against a washer 25 which is held between the inner edge of said cup and the plate 22. The cup 24 has a plurality of laterally extending elongated openings 24ª therethrough and these openings are disposed substantially in alinement with the concave surface of the disk 23. The plate 22 has an inwardly extending flange 22ᵇ at its outer edge and a plurality of blade members 26 are secured to the member 22 overlying the flange 22ᵇ, said blades having portions 26ª extending across the top or rear side of the plate 22 and having their top or rear surfaces flush with the surface of said plate. The blades 26 diverge in a direction substantially in line with the surface of the disk 23 or when the head is disposed about a vertical axis in a downward and outward direction. The blades 26 as shown in Fig. 2 do not extend directly radially but are at a slight angle to the radii of member 22 or slightly tangential. The blades 26 have substantially flat portions 26ᵇ with substantially parallel inner and outer surfaces. The inner surfaces of the portions 26ᵇ are disposed quite close to the disk 23 at the edge thereof as shown in Fig. 4 and it will be noted that said blades are disposed at an angle to each other and at an angle to a circle concentric with the disk 23. The blades are thus offset relatively to each other so that air will pass between the blades in the rotation of the head. It will be noted that the space between the blades 26 or the portions 26ᵇ thereof extend inward of the edge of disk 23. The blades have straight edges which diverge somewhat outwardly and also have straight outer ends disposed at a slightly sharper angle to the forward edge of the blade and to the rearward edge. The inner surfaces of the portions 26ᵇ are somewhat distorted but substantially flat or very slightly convex. The blades 26 are each secured to the member 22 by a pair of screws 27 extending from the inner side of the disk 22 and having their heads countersunk therein.

In operation the head will be disposed in the drying chamber as shown in Fig. 1 and said head will be rotated at high speed as stated, at about three or four thousand revolutions per minute, the rotation being in the direction indicated by the arrows in Figs. 2 to 4. The milk or other liquid is fed downward into the conduit 21 into the cup 24 and is thrown outwardly by the rotation of the head through the discharge openings 24ª onto the surface of disk 23. The liquid spreads over the surface of said disk in a thin film and is rapidly thrown to the outer edge thereof. As the liquid leaves the outer edge of disk 23, it is received on the inner surfaces of the blades 26ᵇ and moves outward on said blades. The disk and blades moving together, the peripheral speed at the outer edge of the disk and the surface of the blades adjacent thereto is, of course, the same and the liquid is transferred to the blades without any appreciable impact or beating action. The liquid is distributed over the inner surface of blades 26 and is thrown outwardly from the blades at the ends and the sides thereof. The liquid passes around the rear edges of the blades and is distributed substantially half way or slightly more on the outer surface of the blades. As the head is rotated, the air passes between the portions 26ᵇ of the blades so that the films of liquid thrown from the blades are separated by the film or layer of air passing between the blades. The blades, owing to the disposition of their surfaces, act as a fan and drive a current of air outwardly and downwardly. This causes the current to move between the blades at high velocity and the material on the blades both at the inner and outer surfaces thereof is subjected to air currents moving at high velocity. The material on each blade is thus subjected to the air both at the inner and outer sides thereof, as is the film of material thrown from the blade. By this action of the air on the material an exceedingly fine division of material is obtained, which division is at the same time obtained without any impact on the material.

This results in a division of the material without breaking up the natural globules forming the same.

With a drying apparatus using a distributing disk of 15 inches in diameter, it has been necessary to rotate the disk at 7000 revolutions per minute, obtaining a peripheral speed of substantially 300 miles per hour. With such a disk the film of liquid is really acted upon in only one plane or one conical surface. Also, with such a disk 15 inches in diameter, a distributing edge of substantially 47 inches in extent is obtained. My device is in practice substantially 8 inches in diameter. The outer ends of the blades are about two inches in length and each edge is about 3 inches long. Assuming that the liquid is only distributed from one edge and the end with 16 blades as illustrated, a distributing edge of 80 inches is obtained. Furthermore, the air acts on both sides of the film thrown outward by each blade and the air passing in between the blades has a very great divisive action. My apparatus, therefore, will divide a much heavier and thicker layer or film then will such a disk as described above. The material is distributed from the apparatus in an umbrella like shower and owing to the fact that the distributor creates quite a downwardly extending current, the majority of the material is impelled downwardly. Some of the material, of course, is thrown outward almost horizontally, but the heaviest distribution is downward and near the center of the distributor.

As the material is thrown downwardly by the head 12 in the cabinet shown in Fig. 1, the hot air is directed upwardly in the cabinet by the deflector 18 and within the cylinder 19. This air is at the center of the cabinet and is thus in line with the heaviest distribution which, as stated, is near the center of the distributor. The air rising from cylinder 19 and deflector 18 gradually extends outwardly and is delivered very effectively into the falling shower of finely divided or atomized liquid, which liquid is almost instantaneously dried and falls to the bottom of the cabinet. The air rising at the central part of the cabinet meets the main portion of the material projected downwardly at the center and the latter is thus effectively dried. Hot air is also forced into the cabinet through openings 13ª and passed downwardly through the material principally at the outer sides of the shower. The air is drawn from the cabinet through the conduit 20 and some of the lighter material is withdrawn with this air which is run through dust collectors in which the material carried by the air is collected.

In Fig. 7 is shown a slightly different form of distributing apparatus which includes the conduit 21 already described as well as the member 22 and the blades 26. These parts are exactly the same as described in connection with Figs. 2 to 4. The disk 23, however, and cup 24 are omitted and a larger cup or shell 28 is screwed into the annular flange 22ª of member 22. Member 28 has a closed bottom and a multiplicity of spaced holes 28ª adjacent said bottom through the side wall thereof, which holes are shown as substantially of the same diameter.

It may be stated that one of the blades 26 is shown detached in Figs. 5 and 6.

In the operation of the device shown in Fig. 7, the same will be disposed in the cabinet as shown in Fig. 1 and the material delivered thereto through the pipe 21. The material is thrown outwardly from the cup 28 through the holes 28ª, said material passing out in a rather thick film and is projected into the path of the blades 26. The peripheral speed of the material will be much less than that of the blades and as it encounters the blades it is beaten or impacted thereby and thus broken up and distributed on the blades. The material after being distributed on the blades is as above described subjected to the terrific force of the air as the head rotates and is thrown from the blades in an extremely fine condition. The action of the head shown in Fig. 7, therefore, is quite different from that shown in the other figures as the head shown in Figs. 2 to 4 is designed to act on the material without any appreciable impact. The head shown in Fig. 7 has been found to be very efficient and successful in drying buttermilk, while the head shown in Figs. 2 to 4 has been found to be very efficient in drying whole milk. It is often desired to place the dried whole milk in solution to reconstruct the natural milk by mixing the dried milk with water. It is desirable, therefore, that the natural globules of the milk be not broken so that the dried product will go into solution very quickly. With such a solution of dried whole milk, the cream will rise thereon, just as in the natural fresh milk.

From the above description it is seen that I have provided a very simple and highly efficient distributing and dividing apparatus for drying liquid. The device is comparatively small in diameter and yet need not be driven at such high speed as previous devices of larger diameter. In practice it has been possible with the cabinets to dry over 300 pounds of whole milk per hour with the present distributing head, while with previous heads 200 pounds per hour was considered a large output. The device has been amply demonstrated in actual practice and found to be very successful and efficient.

It will, of course, be understood that various changes may be made in the form, details, arrangement and proportions of the parts, without departing from the scope of my invention, which, generally stated, consists in a device capable of carrying out the objects above set forth, in the novel parts and combinations of parts disclosed and defined in the appended claims.

What is claimed is:—

1. A distributing head for a liquid drying apparatus comprising, a feeding means, a revoluble member receiving said liquid from said feeding means and distributing the same in a film thereon and spaced liquid distributing means surrounding said member and rotated by means other than said liquid and having surfaces extending closely adjacent said revoluble member so as to receive said material from said member substantially without impact and throw the same outwardly and downwardly in a finely divided condition.

2. A distributing head for a liquid drying apparatus comprising a feeding means, a revoluble means receiving the liquid from said feeding means and distributing the same in a thin layer and a plurality of spaced rotating members driven by means other than said liquid, and having surfaces receiving said layer from said revoluble means substantially without impact and discharging the same outwardly and downwardly in a finely divided condition, and arranged so that air passes therebetween in the rotation of said head.

3. A driven rotatable distributing head for a liquid drying apparatus comprising a feeding conduit having lateral discharge openings, a revoluble concave disk having its surface substantially alined with said openings and receiving therefrom and a plurality of circumferentially spaced blades having their inner surfaces closely adjacent for receiving said liquid from said disk, said blades having their inner surfaces disposed at an angle to each other and said blades diverging away from said disk in the general direction of the elements of the surface of said disk.

4. A driven rotatable distributing head for a drying apparatus comprising a substantially vertical conduit having a closed lower end and lateral discharge openings adjacent the same, a concave disk surrounding said conduit and having its surface substantially alined with said openings and receiving therefrom and a plurality of circumferentially spaced blades having their inner surfaces closely adjacent and receiving from the outer edge of said disk, said blades being disposed at an angle to each other and to the edge of said disk and diverging downwardly and outwardly below said disk.

5. A driven rotatable distributing head for a drying apparatus comprising a central member having lateral discharge openings, a distributing member surrounding said first mentioned member and having a surface substantially alined with and receiving from said openings and a plurality of spaced members revoluble with and adjacent the outer edge of said last mentioned member having surfaces receiving therefrom and disposed so that air passes therebetween in the rotation of said head, said spaced members projecting away from said second mentioned member.

6. A driven rotatable distributing head for a drying apparatus comprising a central conduit, a cup at the lower end of said conduit having lateral discharge openings, a disk rigid with said cup and having a concave surface surrounding said cup and alined with said discharge openings and receiving therefrom and a plurality of circumferentially spaced blades having surfaces closely adjacent and extending away from the outer edge of said disk.

7. The structure set forth in claim 6, said blades having substantially parallel inner and outer surfaces and being disposed at an angle to each other so that spaces are formed therebetween for the passage of air.

8. A distributing head for a liquid drying apparatus comprising a rigid revoluble unit having a central feeding means, an intermediate portion receiving from said means and distributing the material outwardly and an outer portion rotated by means other than said liquid, and comprising outwardly extending spaced blades adapted to receive the liquid from said intermediate portion, said blades being arranged so that air passes therebetween in the rotation of said head.

9. The structure set forth in claim 8, said blades having substantially parallel inner and outer surfaces and being disposed at an angle to each other and to a circumference cencentric with said head.

10. A drying apparatus having in combination, a drying cabinet, means adjacent the top and center of said cabinet for distributing liquid outwardly and downwardly in finely divided condition in an umbrella-like shower with most of the material directed downwardly adjacent the center of said shower, means adjacent the bottom and center of said cabinet for forcing a blast of gaseous drying medium upwardly in said cabinet, said means including deflecting means causing said gaseous drying medium to be directed helically and outwardly, and means through which the spent air is drawn from said cabinet at the sides thereof a short distance above said last mentioned means.

11. The structure set forth in claim 10, means for forcing air downwardly in said cabinet disposed above and around said shower.

12. The method of drying whole milk which consists in distributing the same centrifugally on a surface to form a thin film, distributing said film without impact onto a plurality of spaced surfaces rotating at high speed and causing air to pass between said surfaces to separate said milk into finely divided condition as it is thrown from said surfaces centrifugally.

13. The method of drying whole milk or similar liquid which consists in distributing said milk centrifugally in a thin film or layer, transferring said film without impact to a plurality of spaced rotating surfaces, causing air to pass at high velocity between and adjacent said surfaces to separate said milk into finely divided condition as it is thrown from said surfaces.

14. The method of drying milk or similar liquid which consists in distributing the same centrifugally in finely divided condition in an umbrella-like shower, directing most of said material downwardly adjacent the center of said shower and forcing a heated drying medium upwardly at the center of said shower in an expanding blast whereby the main portion of the air meets the main portion of the projected material.

15. A distributing head for a liquid drying apparatus having in combination liquid distributing means rotated by means other than said liquid and including a plurality of spaced members having liquid receiving surfaces thereon from which the liquid is thrown by centrifugal force, said members being spaced for the passage of air therebetween and along said surfaces in the rotation of said head, and means for delivering the liquid to said members in a thin layer or film without impact, whereby the liquid is very finely divided by the action of said air as it is thrown from said members.

16. The method of drying milk which consists in distributing said milk in a film onto a thin rotating member having substantially flat surfaces at its opposite sides, said milk being distributed on both of said surfaces, throwing said milk from said member in a thing film and causing currents of air of high velocity to pass along the surface at both sides of said member and along both sides of said film.

17. A distributing head for a liquid drying apparatus comprising a rigid rotating unit comprising a central vertically extending conduit, a bowl-like receptacle at the bottom of said conduit and receiving therefrom having spaced peripheral openings therethrough, a concave disk extending about said receptacle having its under and concave surface substantially alined with said openings, and a plurality of spaced outwardly and downwardly inclined blades extending in the general direction of the edge of said disk and outwardly therefrom, said blades being arranged at a slight angle to each other in spaced circumferential relation.

In testimony whereof I affix my signature.
JOHN C. MacLACHLAN.